June 1, 1971 R. S. BRACKEN 3,582,309
TRIPLE GOB FEEDER HAVING ADJUSTABLE PLUNGERS
Original Filed Aug. 14, 1967 2 Sheets-Sheet 2
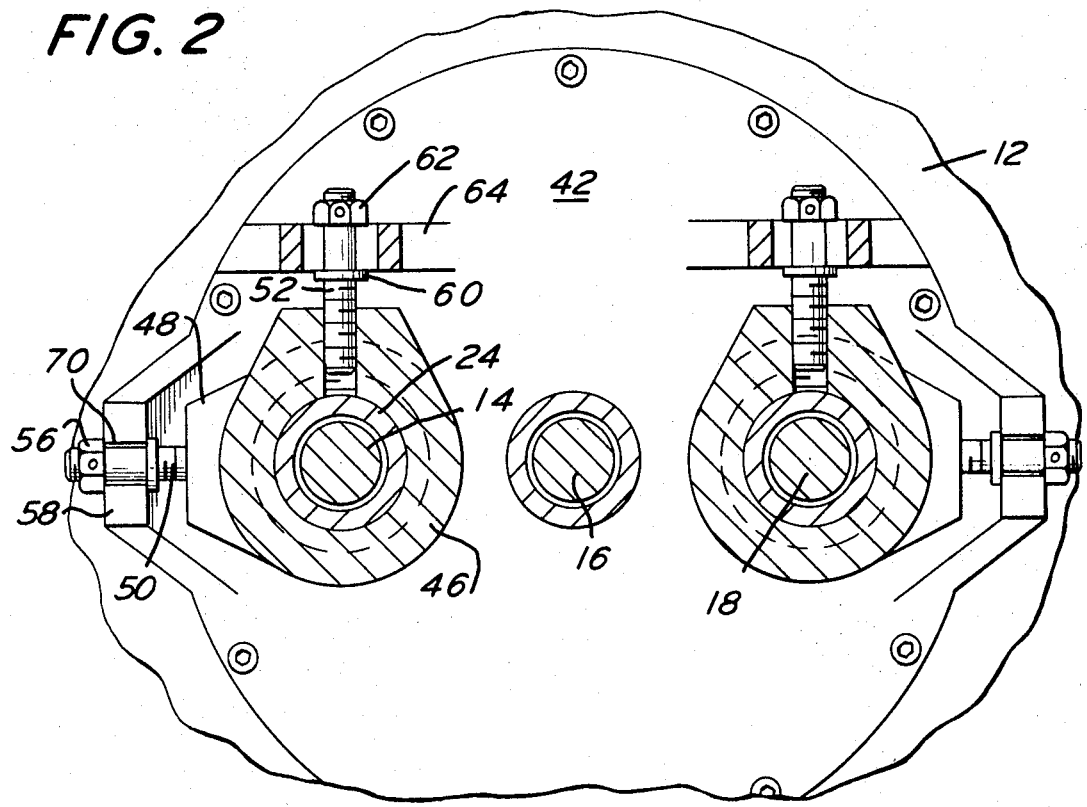
FIG. 2
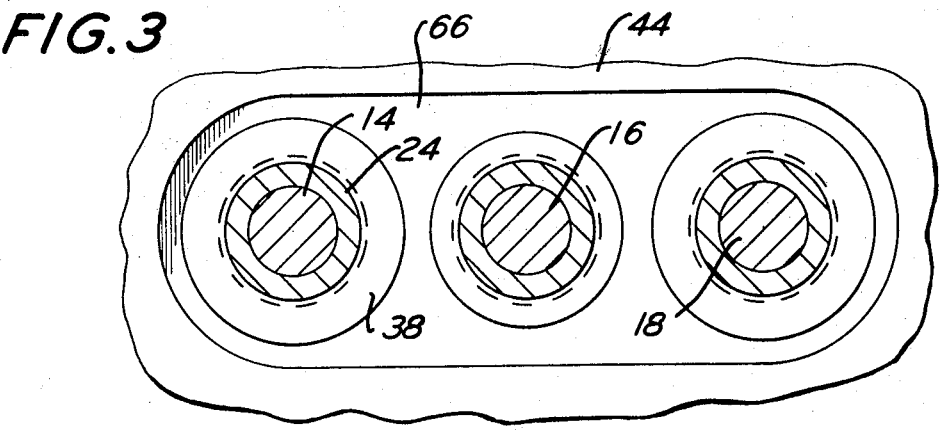
FIG. 3
FIG. 4
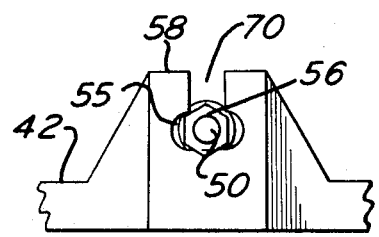
INVENTOR
ROBERT S. BRACKEN
BY
ATTORNEYS.

United States Patent Office 3,582,309
Patented June 1, 1971

3,582,309
TRIPLE GOB FEEDER HAVING ADJUSTABLE PLUNGERS
Robert S. Bracken, Vineland, N.J., assignor to Maul Bros. Inc., Millville, N.J.
Continuation of abandoned application Ser. No. 660,474, Aug. 14, 1967. This application Mar. 16, 1970, Ser. No. 18,790
Int. Cl. C03b 7/00
U.S. Cl. 65—328                                         6 Claims

ABSTRACT OF THE DISCLOSURE

Feeder for molten glass is provided with three aligned plungers of which the two outside ones are adjustable in directions perpendicular to the longitudinal axis of the plungers.

---

This is a continuation of application Ser. No. 660,474, now abandoned.

The present invention relates to a feeder for molten glass, particularly to a feeder having three aligned plungers so as to facilitate discharge of three glass streams which will be cut into gobs of glass. The center plunger is only adjustable vertically. The outside plungers are vertically adjustable and are also adjustable in all horizontal directions. As a result of such adjustable plungers, the flow through the three orifices in the orifice ring may more accurately be controlled.

It is an object of the present invention to provide a triple gob plunger arrangement wherein at least two of the plungers may be adjusted in all horizontal directions.

It is another object of the present invention to provide a glass feeder having a novel triple gob plunger arrangement.

It is another object of the present invention to provide a glass feeder having a plunger adjustable in vertical and horizontal directions so that the flow pattern through an orifice ring may be more accurately controlled.

It is still another object of the present invention to provide a plunger arrangement which is structurally interrelated in a manner which is novel, simple, inexpensive to construct, while being reliable.

Other objects will appear hereinafter.

For the purpose of illustrating the invention there is shown in the drawings a form which is presently preferred; it being understood, however, that this invention is not limited to the precise arrangements and instrumentalities shown.

FIG. 2 is a sectional view taken along line 2—2 in FIG. 1.

FIG. 3 is a sectional view taken along line 3—3 in FIG. 1.

FIG. 4 is a view taken along the line 4—4 in FIG. 1.

Figure 1:
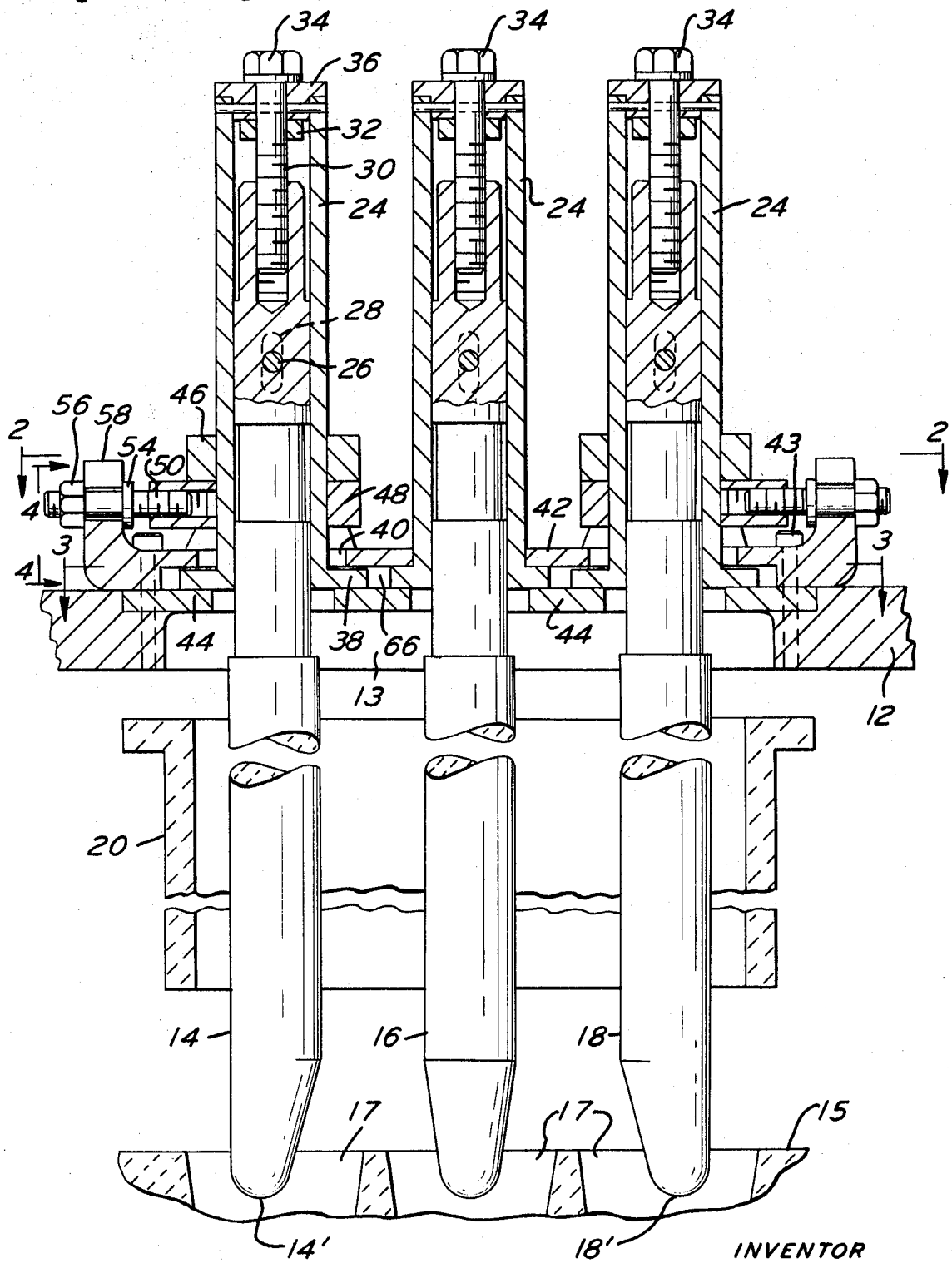
FIG. 1 is a vertical sectional view through the top of a feeder showing the plunger arrangement.

Referring to the drawing in detail, wherein like numerals indicate like elements, there is shown a portion of a feeder designated generally as 10. The feeder 10 includes a top wall 12 having an elliptical hole 13 therein. Three plungers identified as 14, 16 and 18 are supported by the top wall 12 and extend through the hole 13.

The plungers 14, 16 and 18 extend through a ceramic tube 20. The ceramic tube is provided with a radially outwardly directed flange at its upper end and adapted to be coupled to structure for rotating the same about its longitudinal axis. Such structure may be that as shown in U.S. Pat. 2,310,290. The plungers are of sufficient length so as to have their lower terminal ends juxtaposed to one of the three orifices 17 in the orifice ring 15. The plungers are vertically adjustable so that they may move toward and away from their respective orifice 17 as will be explained hereinafter.

The plungers 14, and 18, are identical. Hence, only plunger 14 will be described in detail. Plunger 16 is identical with plunger 14 except that it is not mounted for movement in the horizontal direction. Further, it will be noted from FIG. 1 that the lower terminal end of plunger 16 is concentric with respect to its longitudinal axis whereas the terminal ends of plungers 14 and 18 are contoured so as to have their tips 14' and 18' offset with respect to their longitudinal axes.

Plunger 14 extends upwardly into a cylinder 24. A pin 26 fixed to the plunger 14 is guided by an elliptical hole 28 in the cylinder 24. The relationship between pin 26 and hole 28 assures that the plunger 14 will not rotate when being adjusted vertically.

A bolt 30 has its lower end threadedly engaged with threads in a blind hole at the upper end of plunger 14. Bolt 30 has a collar 32 fixed thereon and a head 34. Collar 32 and head 34 are on opposite sides of the stationary wall 36 closing the upper end of cylinder 24. Rotation of bolt 30 will cause any one of the plungers 14, 16 or 18 to reciprocate without rotating.

A plate 42 is removably fixed to the top wall 12 such as by bolts 43. Plate 42 has three holes therein, each designated as 40. Each of the cylinders 24 extends through one of the holes 40 in plate 42. Each cylinder 24 has a radially outwardly directed flange 38 at its lower end. Each of the flanges 38 are below the plane of plate 42.

The diameter of the center hole 40 corresponds to the outer diameter of the center one of the cylinders 24. Hence, the plunger 16 cannot move in a horizontal direction, that is, parallel to the plane of plate 42. The remaining of the holes 40 are substantially larger than the outer diameter of their respective cylinders 24, by an amount such as one-half inch, so that the cylinders 24 for plungers 14 and 18 may move in a horizontal direction. Each of the flanges 38 rests on a stationary spacer 44. Hole 13 is countersunk to receive spacer 44. Spacer 44 has holes concentric with the holes 40.

Annular members 46 and 48 surround and are rotatable with respect to the cylinders 24 associated with the plungers 14 and 18. Each of the members 46 and 48 may freely rotate with respect to each other and the cylinders 24. Annular member 48 is threadedly coupled to one end of a bolt 50. Bolt 50 has a collar 54 fixed thereon and spaced from a head 56. Bolt 50 extends through an ear 58 disposed between collar 54 and head 56.

Likewise, member 46 is threadedly coupled to one end of bolt 52 having a similar collar 60 and head 62. See FIG. 2. Bolt 52 extends through a hole in an ear 64 which is disposed between the collar 60 and head 62. Independent and/or simultaneous adjustment of bolts 50 and 52 may cause the flange 38 on the cylinder 24 for the plungers 14 and 18 to move in all directions to the extent limited by the annular space 66. As shown more clearly in FIGS. 1 and 3, space 66 is an elliptical recess on the bottom surface of plate 42. The ears 58 and 64 are integral with or fixedly secured to the plate 42. The holes in the ears 58 and 64 through which the bolts 50 and 52 extend are elliptical with the major axis being horizontal. As shown in FIG. 4 a notch 70 in ear 58 facilitates entry of bolt 50 into the elliptical hole 55. When the head on one bolt is tightened, the other head should be loosened so that the loosened bolt may pivot in its elliptical hole. When the tip 14' has been adjusted to the desired position with respect to the orifice 17, the heads on the bolts are thereafter tightened. The extent of movement in any horizontal direction for the plungers 14 and 18 is seldom more than one-quarter of an inch in a radial direction when the plungers are one to one and one-half inches in diameter.

Hereinafter, plate 42 and all elements supported thereon including cylinder 24 may be referred to as a means supported by the feeder 10 for adjusting the plunger 14 toward and away from the orifice ring 15 and for supporting the plunger 14 for movement in a horizontal direction substantially perpendicular to its longitudinal axis. It will be understood by those skilled in the art that the top wall 12 is part of and/or supported by a housing within which molten glass is adapted to be supported and that such molten glass will discharge from the housing by flowing through the orifices 17 in the orifice ring 15. The flowing streams of molten glass are cut by blades into gobs in a manner well known to those skilled in the art.

The orifice ring is made from a refractory material. The plungers may be made from a refractory material but are preferably made from a high temperature resistant gas-free metal such as Inconel 600. Wall 12 need not be the top wall of the feeder housing but may be only a movable plate or partition coupled to a handwheel for facilitating simultaneous up and down movement of the plungers.

The present invention may be embodied in other specific forms without departing from the spirit or essential attributes thereof and, accordingly, reference should be made to the appended claims, rather than to the foregoing specification as indicating the scope of the invention.

I claim:

1. A glass feeder comprising a housing, said housing including an orifice ring having an orifice therein and a top wall having an opening therein, said opening and said orifice being in substantial alignment, a hollow cylindrical member having a radially disposed flange at one end, said flange being supported by said top wall so that said hollow cylindrical member overlies said opening, an elongated plunger mounted in said hollow cylindrical member for vertical reciprocating movement, first and second collars mounted externally of said cylindrical for relative rotation thereabout, two elongated mutually perpendicular members, each having one end coupled to one of said collars and having its other end coupled to said top wall for selectively moving said hollow cylindrical member and said plunger in a horizontal plane relative to said opening, said flange being substantially larger than said opening so that it maintains a closure over said opening during said selective movement, and a threaded member supported by said cylinder and received in said plunger for selectively moving said plunger along its longitudinal axis.

2. A glass feeder comprising a housing, said housing including an orifice ring having three spaced linearly disposed discharge passages for discharging three molten glass streams from said housing, three spaced linearly disposed plungers supported by said housing for vertical reciprocating movement, each of said plungers being in substantial vertical alignment with one of said spaced, linearly disposed discharge passages so that reciprocating movement may cause said plungers to enter one of said discharge passages, means connected to each of said end plungers for moving them in a substantially horizontal plane to enable axial disalignment of said discharge passages and said end plungers so that the flow of molten glass from said end orifices can be regulated to compensate for the thermal influence of said center stream on the facing surfaces of said end streams, and said center plunger being constrained against movement in a horizontal plane.

3. A feeder in accordance with claim 2 wherein the lower tip of each of said end plungers is spaced from its longitudinal axis such that the longitudinal axes of each of said end plungers are intermediate their respective tips and said center plunger.

4. A feeder in accordance with claim 2 including means supported by said housing and connected to each of said plungers for independently moving said plungers toward and away from said orifice ring, said means including a cylinder surrounding the upper portion of each of said plungers and a threaded member coupling each cylinder to its plunger for adjusting its plunger along the longitudinal axis of each cylinder, the cylinders for at least said outside plungers having radially outwardly directed flanges supported by said housing, and said means for moving said end plungers in a substantially horizontal plane include two mutually perpendicular members coupled directly to each of said end cylinders.

5. A feeder in accordance with claim 2 wherein at least said end plungers extend into one end of separate hollow elongated cylinders, said end of each of said cylinders having a radially outwardly directed flange, said housing having a top wall with three spaced linearly disposed openings therein with one of said plungers disposed in each of said openings, each of said flanges being supported by said top wall so that an annular space is provided between said plungers and the boundaries of said openings to accommodate said horizontal movement, and said flanges are substantially larger than said openings so that they maintain a closure over said openings during said horizontal movement.

6. A feeder in accordance with claim 2 wherein said means for moving said end plungers in a substantially horizontal plane include a separate hollow cylinder surrounding each of said end plungers mounted for horizontal movement, a pair of collars rotatably supported by each of said cylinders with each of said collars being connected to a threaded member, and said threaded members associated with each cylinder are substantially perpendicular to each other.

References Cited

UNITED STATES PATENTS

| | | | |
|---|---|---|---|
| 1,844,847 | 2/1932 | Good | 65—330 |
| 1,926,764 | 9/1933 | Dorman | 65—328 |
| 3,248,204 | 4/1966 | Tyner | 65—330 |

ARTHUR D. KELLOGG, Primary Examiner

U.S. Cl. X.R.

65—323, 330

UNITED STATES PATENT OFFICE
CERTIFICATE OF CORRECTION

Patent No. 3,582,309     Dated June 1, 1971

Inventor(s) Robert S. Bracken

It is certified that error appears in the above-identified patent and that said Letters Patent are hereby corrected as shown below:

Column 3, line 38, after "cylindrical" insert -- member --; line 47, "cylinder" should read -- cylindrical member --.

Signed and sealed this 18th day of January 1972.

(SEAL)
Attest:

EDWARD M. FLETCHER, JR.  
Attesting Officer

ROBERT GOTTSCHALK  
Acting Commissioner of Patents